United States Patent Office 3,658,745
Patented Apr. 25, 1972

3,658,745
ACETALATED CROSS-LINKED POLYVINYL ALCOHOL HYDROGELS
Edward W. Merrill and Patrick Seck-Lai Wong, Cambridge, Mass., assignors to Massachusetts Institute of Technology, Cambridge, Mass.
No Drawing. Filed Jan. 14, 1970, Ser. No. 2,970
Int. Cl. C08f *3/34, 29/32*
U.S. Cl. 260—29.6 B                3 Claims

ABSTRACT OF THE DISCLOSURE

An acetalated cross-linked hydrogel capable of imbibing water and micromolecular water solutes and excluding macromolecular water solutes by the process of swelling upon cooling prepared by reacting a polymer containing a plurality of near neighbor hydroxyl groups or containing hydroxyl groups and ether groups, a monoaldehyde and a dialdehyde, the reagents being initially in a state of homogeneous aqueous solution.

---

This invention relates to cross-linked hydrogels useful for separation of water-soluble micromolecular materials from macromolecular materials and to a process for effecting the separation.

The separation of macromolecules such as proteins from low molecular weight water solutes is conventionally accomplished by membranes such as cellophane or collodion that are impermeable to the macromolecule or by chromatographic gels such as Sephadex(R). In conventional dialysis with membranes such as cellophane, the driving potential for water removal from the protein solution is the osmotic pressure difference, which may be supplied effectively either by imposing hydrostatic pressure on the protein solution relative to the aqueous solution or by placing a macromolecular solute, to which the membrane is impermeable, in high concentration on the side of the membrane opposite from the protein solution. Dialysis must be used, in contradistinction to simple dehydration by vaporization, when it is required to concentrate the macromolecular species without concentrating the micromolecular materials, or when it is necessary ultimately to separate the macromolecular material from micromolecular solute species.

Whereas both of these methods are efficacious, extensive periods of time and rather large scale equipment are required. These factors have liimted greatly the use of these methods, particularly in medical applications. For example, there is a present scarcity of apparatus referred to as artificial kidneys because of its exceedingly high cost, a major contribution to which results from the long periods necessary for treating each patient adequately. Separation process relying on osmotic pressure differentials as the driving potential necessarily require relatively long separation times since the pressure that can be imposed is limited by the strength of the membrane.

This invention provides a hydrogel capable of imbibing water and water soluble microcolecules and excluding macromolecules such as proteins. It is based upon the discovery that by carefully regulating the degree of cross-linking and acetalation of hydroxyl containing polymers previously dissolved in aqueous solution the resulting modified hydrogel is eminently suitable for effecting this type of separation. Cross-linking is primarily effected by reaction of the polymer hydroxyl groups with a dialdehyde while acetalation is primarily effected by reaction of the polymer hydroxyl groups in adjacent pairs with a monoaldehyde. Increasing the degree of cross-linking reduces the hydrogel's capability for imbibing water and micromolecular water solutes and increases its capacity to exclude macromolecular materials.

The modified gel of the invention becomes more strongly dissolved by water as its temperature is lowered, leading to avid imbibition of water and micromolecular components. The thermodynamic potential with which water is imbibed corresponds to many atmospheres of hydrostatic pressure. The imbibition of water and swelling observed as the gel is cooled has as its counterpart the release of water and shrinking of the gel as the gel is warmed, the cycle being indefinitely reversible. The more acetalated to the gel, that is, the higher is the percent conversion hydroxyl groups to acetal rings, the more responsive is the gel to temperature change by swelling upon cooling and shrinking upon heating. In consequence, when the gel is cooled while immersed in a solution of a macromolecular or protein species, it imbibes from the solution water and micromolecular solutes dissolved in the water, but not the macromolecular or protein species. When the gel is then removed from the solution and warmed, it releases the water and micromolecules absorbed from the original solution. This results in a concentration of the macromolecular species, or alternatively dialytic purification when pure water is added to the macromolecular solution after each cycle.

While the modified hydrogels are useful in a wide variety of applications involving material separation, they are particularly applicable for removing water-soluble micromolecular materials from blood. Since the driving potential for imbibition is thermodynamic, the separation speed is affected primarily by the time needed to swell and then shrink the hydrogel. This swelling and shrinking can be effected with a wide variety of readily available heating-refrigeration systems. Thus, the hydrogels of this invention provide substantial advantages over presently available compositions employed in dialysis. This advantage is particularly significant when it is desired to purify blood of water-soluble wastes.

As used herein, the terms "macromolecular" or "macromolecule" refer to materials having a molecular weight above about 10,000 and preferably above about 40,000.

The polymers useful for preparing the modified hydrogels of the invention, contain a plurality of near neighbor hydroxyl groups, or contain hydroxyl groups and ether groups, and are capable of being acetalated with a monoaldehyde and cross-linked with a dialdehyde. Representative of a polymer containing a plurality of near neighbor hydroxyl groups, polyvinyl alcohol is a preferred polymer because of its low cost, thermal and chemical stability, and ease of cross-linking and acetalization. Other polymers of this type that may be used are amylose, amylopectin, and the dextrans.

Representative of polymers containing hydroxyl and ether groups are polyurethanes prepared from dihydroxyalkyl oxides, such as dihydroxy polyethylene oxide of low molecular weight and polyhydroxy compounds such as glycerol synthesized to a point short of gelation by classical diisocyanate chemistry in an anhydrous milieu. Such special polyurethanes may then be dissolved in water and cross-linked via acetal bond formations with aldehydes, especially dialdehydes.

Suitable monoaldehydes that may be used herein include formaldehyde, acetaldehyde and butyraldehyde, with formaldehyde being preferred. Suitable dialdehydes are glyoxal and klutaraldehyde with glutaraldehyde being preferred.

For convenience, the invention is described below with reference to a polyvinyl alcohol hydrogel modified with formaldehyde and glutaraldehyde. It is to be understood that the procedure set forth also is applicable to hydrogels other than polyvinyl alcohol.

A gel is prepared by first dissolving 100% deacetylated polyvinyl alcohol in water to the extent of 5 weight percent, adding thereto a mixture of formaldehyde and glutaraldehyde in a molal ratio of polyvinyl alcohol hydroxyl groups to total aldehyde groups of between 0.2 and 2, that is to say, the ratio of moles of polyvinyl alcohol mer units —$CH_2CHOH$—, mer weight 44, to the sum of the moles of monoaldehyde plus twice the moles of dialdehyde, and sufficient mineral acid such as sulfuric acid to produce a final normality of 0.05 to 0.2. This permits gelation to occur within a period of 40–60 minutes at a temperature of 70° C.–80° C. If the gel is prepared exclusively with a monoaldehyde such as formaldehyde it will exhibit profound volume change upon heating and cooling, but the degree of cross-linking is so low that the gel will not exclude macromolecules and therefore is useless for the purpose at hand. On the other hand if the gel is prepared exclusively with dialdehyde such as glutaraldehyde or glyoxal the frequency of cross-linking is sufficient to exclude the proteins and other macromolecules, but the gel is incapable of significant expansion or contraction by thermal cycling.

We have found that an excellent balance of properties is achieved by using a mixture of formaldehyde and glutaraldehyde in a 70:1 to 1000:1, preferably about 680:1 molal ratio, with about 6.7 weight percent formaldehyde in the aqueous solution of polyvinyl alcohol, in which the weight percent of polyvinyl alcohol is between 3 and 15 weight percent and preferably about 5 weight percent. Addition of sulfuric acid to give a final stoichiometric normality of between 0.05 and 0.2 is sufficient to result in cross-linking with a sufficient frequency to exclude macromolecules such as found in plasma including albumin and all higher proteins. The apparent molecular weight cut-off as deduced by dextran species is approximately 40,000 molecular weight for this type of gel.

The following example illustrates the present invention and is not intended to limit the same.

EXAMPLE I

A typical response of the modified polyvinyl alcohol gel described is shown with reference to a protein solution comprising 5.0 weight percent human serum albumin dissolved in isotonic saline. The gel at 37° C. has a volume as synthesized of 100 ml. (It should be less at higher temperatures, which are excluded in this example because of denaturation of the protein.) Two hundred milliliters of the stated protein solution are brought into contact with the gel and the two are cooled together to 12° C. The gel expands in volume to about 50% of its final equilibrium value over a period of approximately 2 hours and attains a total volume of 130 ml. Correspondingly, the protein solution loses water and is reduced to a total volume of 170 ml. The cold swollen gel is then separated from the protein solution and allowed to rewarm to 37° C. whereupon it shrinks within 20 minutes to its initial size expressing from itself approximately 30 ml. of the isotonic saline solution which was the solvent for the initial albumin solution. The albumin solution has correspondingly been concentrated to 5.85 weight percent albumin. The process may be repeated until the concentration of albumin in the solution reaches approximately 10 weight percent. The system may be used to remove micromolecular solutes from the protein solution to any degree desired. One starts with the gel prepared with pure water as its solvent medium, and after each cycle one adds back to the protein solution an amount of distilled water equal to the amount of water removed by shrinking of gel as it is rewarmed separately from 12 to 37° C. Thus, for example, when the latter value is 30 ml. of distilled water is added to the protein solution, in this way the concentration of external salts, ions, and micromolecular solutes can be reduced in a quantitatively predictable way depending upon the number of thermal cycles employed.

It is obvious that this procedure is easily capable of automation, and that the basic requirement for its operation, namely changing the temperature, can be readily accomplished with existing commercial refrigeration and heat exchange equipment.

Whereas the preceeding example has been limited to a maximum temperature of 37° C. because of the thermal degradability of plasma proteins, no such limitation is imposed when synthetic macromolecules are to be purified by dialysis by this procedure. Gelatin and collagen may be purified by heating to substantially higher temperatures than 37° C. The practical temperature limits are respectively the freezing point of the solute medium and approximately 90° C., above which vaporization becomes inconveniently great within the gel. Within the practical operative range set forth, the modified gels of this invention expand about 80% during cooling as compared to their volume when warmed.

Generally, the appropriate molal ratio of monoaldehyde to dialdehyde to be reacted with the gel in order that the crosslinking reaction be adequate, and that the acetalization along the polymer chain be sufficient to produce a frequency of acetal ether groups that are responsible for the unique thermocycling properties of the finished gel is between 70:1 and 1,000:1 and preferably 680:1. Any strong acid may be used in the catalysis of the gel formation and any temperature may be used up to 90° C. for crosslinking the gel, the limit being only one of convenience in avoiding gross bubbles.

No limit is placed on the shape of the gel as synthesized, preferably it is in the form of thin sheets, rods, hollow tubes, hollow fibers, or coarsely granulated material characterized by a relatively large surface area to volume ratio in order that as the swelling cycle is induced by cooling the gel in contact with the ambient solution, the swelling of the gel be not impeded by diffusion within the gel matter to a significant extent.

In one aspect of this invention, the cross-linked hydrogel can be modified by reaction with heparin in accordance with the procedure set forth in our copending application, Ser. No. 745,400 filed July 17, 1968. It should be understood that the addition of heparin to the hydrogel is not necessary even when the hydrogel is employed to separate water-soluble wastes from blood.

The heparin bonded hydrogels are obtained by crosslinking the hydroxyl containing polymeric material in the presence of a heparin type anticoagulant.

For convenience of subsequent mixing and casting, the final hydrogel concentration in the mixture can be between 5 and 25 percent by weight. The concentration of sodium heparin should be between 0.2 and 5.0 weight percent, and sulfuric acid or hydrochloric acid concentration of 0.04 to 0.1 N. The final mixture is heated at temperatures between 60 and 90° C. for a range of time from 20 minutes to 12 hours.

What is claimed is:

1. A hydrogel capable of significant expansion upon cooling in water and reversible shrinking upon heating comprising a cross-linked acetalated hydrogel formed by reacting a polyvinyl alcohol previously dissolved in water, a monoaldehyde and a dialdehyde and having a sufficient density of cross-linking to prevent its imbibition of a material having a molecular weight above about 10,000.

2. The hydrogel of claim 1 comprising acetalated polyvinyl alcohol prepared by reacting in an acid medium polyvinyl alcohol, formaldehyde and glutaraldehyde in a molal ratio within the range:

| | |
|---|---|
| $\frac{\text{Polyvinyl alcohol mers}}{\text{Formaldehyde + glutaraldehyde}}$ | 0.2 to 2 |
| $\frac{\text{Formaldehyde}}{\text{Glutaraldehyde}}$ | 70 to 1000 |

3. The hydrogel of claim 2 wherein the molal ratio of formaldehyde to glutaraldehyde is about 680:1.

(References on following page)

References Cited

UNITED STATES PATENTS

| | | | |
|---|---|---|---|
| 2,555,646 | 6/1951 | Jones | 260—65 |
| 3,220,960 | 11/1965 | Wichterle et al. | 260—2.5 |
| 3,379,703 | 4/1968 | Ehmann et al. | 260—91.3 |
| Re. 26,934 | 8/1970 | Mosbach | 260—29.6 |

FOREIGN PATENTS

| | | |
|---|---|---|
| 1,190,658 | 4/1965 | Germany. |

OTHER REFERENCES

Matsuzawq et al., Kobunshi Kagaku 25, 173–76 (1968) (Abstract).

Markle et al., Trans. Am. Soc. Artificial Internal Organs 10, 22–25 (1964) (Abstract).

MELVIN GOLDSTEIN, Primary Examiner

U.S. Cl. X.R.

210—32; 260—17.4, 73 R